United States Patent [19]

Lejeune

[11] 4,376,458

[45] Mar. 15, 1983

[54] BEAD RINGS OF PNEUMATIC TIRES

[75] Inventor: Daniel Lejeune, Clermont-Ferrand, France

[73] Assignee: Compagnie Generale des Etablissments Michelin, Clermont-Ferrand, France

[21] Appl. No.: 318,802

[22] Filed: Nov. 6, 1981

Related U.S. Application Data

[63] Continuation-in-part of Ser. No. 796,681, May 13, 1977, abandoned, which is a continuation-in-part of Ser. No. 652,123, Jan. 26, 1976, abandoned.

[30] Foreign Application Priority Data

Jan. 29, 1975 [FR] France .................................. 75 02872

[51] Int. Cl.³ ............................................. B60C 15/04
[52] U.S. Cl. .................................. 152/362 R; 152/391; 245/1.5; 57/215; 57/216; 57/219; 57/220; 57/222; 57/902

[58] Field of Search ............. 152/362 R, 362 CS, 359, 152/388, 393, 391, 395; 245/1.5; 57/902, 215-216, 219-220, 222, 212, 230

[56] References Cited

U.S. PATENT DOCUMENTS

| 1,003,597 | 9/1911 | Gore ...................................... 57/220 |
| 1,309,308 | 7/1919 | Swinehart ........................ 152/362 R |
| 2,136,865 | 11/1938 | Reed ..................................... 57/220 |
| 3,736,974 | 6/1973 | Lejeune ........................... 152/362 R |
| 3,741,507 | 6/1973 | Hahn ............................... 152/362 R |

FOREIGN PATENT DOCUMENTS 1029627  5/1958  Fed. Rep. of Germany ....... 245/1.5

Primary Examiner—Edward C. Kimlin
Assistant Examiner—Lois E. Boland
Attorney, Agent, or Firm—Brumbaugh, Graves, Donohue & Raymond

[57] ABSTRACT

The properties of a composite bead ring for tires are improved by interposing an annular trifurcated element tangentially of the three unitary bead ring components.

8 Claims, 8 Drawing Figures

BEAD RINGS OF PNEUMATIC TIRES

This application is a continuation-in-part application of U.S. application Ser. No. 796,681, filed May 13, 1977, (now abandoned) which in turn is a continuation-in-part application of U.S. application Ser. No. 652,123, filed Jan. 26, 1976 (now abandoned).

The present invention relates to improvements in pneumatic tires and more particularly to the bead rings of pneumatic tires.

As is known, a tire comprises a crown extended on either side by a sidewall, the end portion of which constitutes the bead. The bead is the connecting member and at times, in the case of tubeless tires, the sealing member between the tire and the wheel rim. In view of these functions the bead must have satisfactory rigidity and strength.

The reinforcement of the bead contributes considerably to the obtaining of these properties. This reinforcement comprises one or more bead rings and the anchoring elements for the reinforcement of the sidewalls. While the reinforcement of the sidewalls comprises at least one ply of cords, the bead ring is an annular element, concentric to the axis of the tire, and is formed of wires arranged in suitable manner, of a material which is resistant to traction, generally steel.

The present invention relates more precisely to improvements in the composite bead rings described in French Pat. No. 2,082,484 (which corresponds to U.S. Pat. No. 3,736,974) and its patents of addition. The composite bead ring described in that patent is formed of three unitary bead rings at least two of which comprise a plurality of wires, each of these unitary bead rings being tangent to the other two. Thus, as seen in radial section, each unitary bead ring occupies the apex of a triangle which is fixed with respect to the rotational axis of the tire. This is a significant feature that enables the composite bead ring to have a very high torsional stiffness. This stiffness is due to the fact that each unitary bead ring should be tangent to the other two along two circles (1) that have center points located on the axis of rotation of the tire and (2) that are contained in different planes which are parallel to the equatorial plane of the tire (or perpendicular to the axis of rotation of the tire). Thus, the three circles of tangency of the composite bead ring have their center points aligned on the axis of rotation of the tire, each of said planes being parallel to the two others and to the equatorial plane of the tire (or perpendicular to the axis of rotation of the tire). This composite bead ring constitutes a very rigid assembly as compared with a single bead ring or several bead rings juxtaposed in any manner whatsoever containing the same amount of material. This composite bead ring nevertheless has the following drawbacks.

First of all, upon assembling the three unitary bead rings, it is difficult to maintain the three unitary bead rings in such a manner that each is tangent to the other two while remaining arranged suitably with respect to the other components of the bead.

Moreover, after a certain period of use in the tire, some wires show breaks. The appearance of these breaks makes it possible to attribute them to the fatigue of the material constituting the wires. Fatigue ruptures are flat radial breaks of the steel wires that are not accompanied by a decrease of the wire cross sections due, e.g., to friction or wear. Said fatigue ruptures are caused by the static contact pressures that the wires exert in radial direction on one another from one unitary wire-bead ring to the adjacent one(s) tangent therewith. These fatigue breaks result in a decrease in the strength and rigidity of the composite bead ring. This results in a decrease in the life of the beads of the tire.

Therefore, the object of present invention is to make the positioning of the unitary bead rings in such a composite bead ring more precise and easier and to remedy the fatigue breaks of the wires contained in the structure of such a composite bead ring without disturbing its torsional stiffness.

Thus, the pneumatic tire in accordance with the present invention having a bead reinforcement which comprises at least one composite bead ring formed of three unitary bead rings at least two of which are formed of a plurality of wires, the radial cross sections of the three unitary bead rings being arranged along the three apices of a triangle which is fixed with respect to the rotational axis of the tire, is characterized by the fact that an annular trifurcated element is arranged between the unitary bead rings so that each of the three branches of the annular trifurcated element is tangent to the radial cross sections of two and of only two of the unitary bead rings, the ends of said branches being located on the inside of the apparent surface defined by the outer countour of the composite bead ring.

Thus, the annular trifurcated element in accordance with the present invention comprises a core and three branches radiating from said core, two adjacent branches forming a groove in which it is easy to house one of the unitary bead rings in such a manner as to determine its position with respect to the other two unitary bead rings and with respect to the axis of the tire. The interposing of a branch of the annular trifurcated element between two adjacent unitary bead rings maintains the properties due to the tangency of the unitary bead rings and decreases the local pressures between the unitary bead rings. The breaks of wires are in fact attributed to the accentuating of these local pressures.

Depending on the amount of these local pressures it is advantageous to select a material of a greater or lesser modulus of elasticity for the production of the annular trifurcated element in accordance with the present invention, which material may be of reinforced or non-reinforced rubber, any plastic, whether or not reinforced, or else a metal or an alloy. When this modulus of elasticity is close to or greater than that of the material or materials constituting the composite bead ring, the annular trifurcated element contributes to increasing the resistance to stretching of the composite bead ring, which may make it possible to effect a saving in materials as compared with the unitary bead rings.

The annular trifurcated element in accordance with the present invention may be a hollow profiled shape, which has the advantage of imparting to said element a certain amount of compressibility in the direction normal to its branches. This hollow profiled shape may be open (split) or closed.

The angles formed by the three branches of the annular trifurcated element in accordance with the present invention, as well as the placing of the three branches on the core of said element are, of course, to be selected in a manner which is appropriate for the desired mutual positioning of the unitary bead rings and/or their dimensions.

The lengths of the branches of the annular trifurcated element are selected in such a manner that the ends of the branches are located on the inside of the apparent surface defined by the outer contour of the composite bead ring in accordance with the present invention. In a preferred variant, however, it is advisable to use an annular trifurcated element having the terminal portion of at least one of its branches shaped so as to form a groove which partially surrounds a unitary bead ring. Such an arrangement is advantageous, since it facilitates the forming of a composite bead ring in accordance with the present invention before the incorporation thereof into the tire. One may use either a closed annular trifurcated element of an elastic material or an open (split) annular trifurcated element or annular trifurcated element in several parts, consisting of a relatively rigid material.

By preference, the composite bead ring according to the invention comprises two radially innermost unitary bead rings of the stranded type, of metallic (e.g., steel) wires and the radii of which rings, with respect to the axis of rotation of the tire, are equal or are unequal, and a third, radially outermost unitary bead ring of greater radius. The branches of the annular trifurcated element and the three unitary bead rings are mutually arranged such that one groove of the annular trifurcated element houses the third radially outermost unitary bead ring and each of the other two grooves house one of the two other radially innermost unitary bead rings. The third radially outermost unitary bead ring also may be of the stranded type of metallic (e.g., steel) wires.

The branches of the annular trifurcated element thus exert a suitable back pressure for maintaining the unitary bead rings in position in their respective grooves. Such a composite bead ring withstands well the customary handling while preserving the selected arrangement of the three unitary bead rings without the use of collars, tapes or wires as customarily arranged around the assembly of the three unitary bead rings.

The invention will readily be understood from reference to the drawing which shows nonlimitative embodiments of the invention, a description of which follows.

Figure 1:
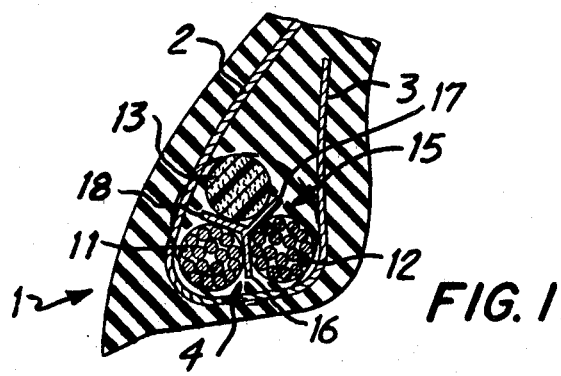
FIG. 1 shows a radial section through a tire bead in accordance with the invention.

FIG. 1 is a radial section through a bead 1 of a tire (not shown). This bead 1 contains a composite bead ring 4. This composite bead ring 4 comprises an annular trifurcated element 15 having three branches 16, 17 and 18 in accordance with the invention, and three unitary bead rings 11, 12 and 13. Each of the branches 16, 17 and 18 is tangent to two and only two of the unitary bead rings 11, 12 and 13. The bead 1 furthermore comprises a portion of the reinforcement of the sidewalls, in the example shown the inner side 2 and the side 3, folded around the composite bead ring 4 in accordance with the invention, of a ply of radial cords. The unitary bead rings 11 and 12 are formed of wires.

They may be both of the package or stranded type or one of one type and the other of the other type. The unitary bead ring 13 is formed of a material reinforced with reinforcing elements.

As can be noted also from FIG. 1, the three branches 16, 17 and 18 of the annular trifurcated element 15 are practially linear and their ends are located on the inside of the contour (dashed line circle), resting against the outer contours of the three unitary bead rings 11, 12, 13.

Figure 2:
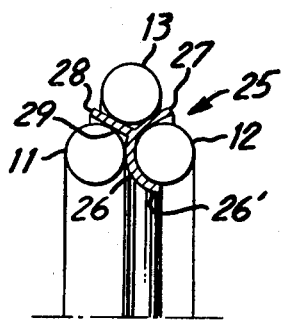
FIGS. 2 to 6 illustrate different embodiments of composite bead rings obtained by means of annular trifurcated elements in accordance with the invention.

FIG. 2 shows a composite bead ring in accordance with the invention which has an elastic annular trifurcated element 25, one branch 26 of which is longer than the other two branches 27 and 28. The longer branch 26 comprises a terminal portion 26' which is bent so as to form a groove which partially surrounds the unitary bead ring 12. As to the unitary bead ring 13, it is wedged in the groove formed by the branches 27 and 28. As can be seen, it is sufficient for the branch 26 to be in contact with the unitary bead rings 11 and 12 at the portion thereof adjacent the central portion or core 29 which is common to the three branches 26, 27 and 28 of the annular trifurcated element 25.

Figure 3:
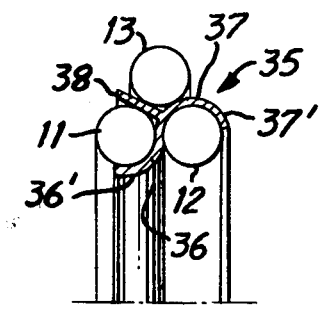

FIG. 3 illustrates a composite bead ring in accordance with the invention having an annular trifurcated element 35, two of the branches 36 and 37 of which are longer than the branch 38 and are curved in the same direction. The terminal portions 36' and 37' of branches 36 and 37 are curved so as to form grooves which partially surround the unitary bead rings 11 and 12, respectively. The tension of the elastic annular trifurcated element 35 compresses the unitary bead ring 12.

Figure 4:
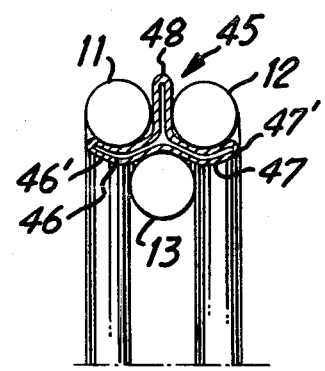
Figure 5:
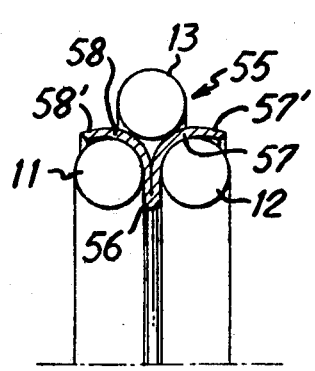

FIGS. 4 and 5 show annular trifurcated elements 45 and 55, respectively, the longest two branches of which, namely 46 and 47 and 57 and 58, respectively, are in the one case of 46 and 47 curved and in the other case of 57 and 58 bent, in opposite directions. The terminal portions 46' and 58' of branches 46 and 58 and the terminal portions 47' and 57' of branches 47 and 57 are shaped so as to form grooves which partially surround the unitary bead rings 11 and 12, respectively. It will thus be noted that the annular trifurcated element 55 results from folding a sheet of material, while the annular trifurcated element 45 is a hollow profiled element. Moreover, the annular trifurcated element 55 of FIG. 5 has a straight radially inwardly oriented branch 56 and two other longer branches 57 and 58 bent in opposite directions toward the axis of rotation of the tire, such as to form grooves each of which partially surrounds one of the radially innermost unitary bead rings 11, 12, the radii of which rings, with respect to the axis of rotation of the tire, may be equal or unequal, but smaller than the radius of the radially outermost unitary bead ring 13.

Figure 6:
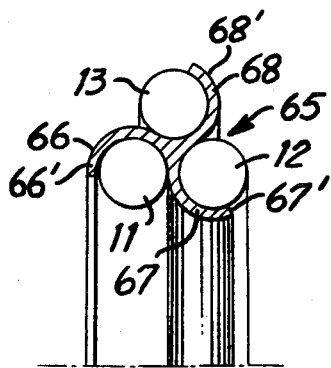

FIG. 6 illustrates the case in which, in a composite bead ring in accordance with the invention, an annular trifurcated element 65 having three branches 66, 67, 68 of equal length and curved in the same direction is used. The terminal portions 66', 67' and 68' of branches 66, 67 and 68 are curved so as to form grooves which partially surround the unitary bead rings 11, 12 and 13, respectively.

The embodiments of FIGS. 2, 3, 5 and 6 show the preferred variant of the invention, wherein the third (13) of the three unitary bead rings is disposed radially outside the two others (11, 12); the radius of the third unitary bead ring is greater than the radii of the two others (11, 12) with respect to the axis of rotation (not shown) of the tire; at least one (e.g., 26, FIG. 2) of the three branches of the annular trifurcated element (e.g., 25, FIG. 2) is shaped so as to form a groove which partially surrounds one unitary bead ring (e.g., 12, FIG. 2); at least the two radially innermost unitary bead rings (e.g., 11, 12, FIG. 2) are of the stranded type of steel wires; the radii of the two radially innermost unitary bead rings (e.g., 11, 12, FIG. 2), with respect to the axis of rotation of the tire, are equal or unequal according to the conicity of the base of the tire bead and of the seat of that base on the wheel rim.

Figure 7:
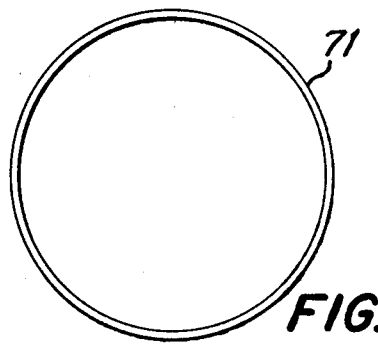
FIGS. 7 and 8 show two annular trifurcated elements, one of the closed type and another of the open (split) type.
Figure 8:
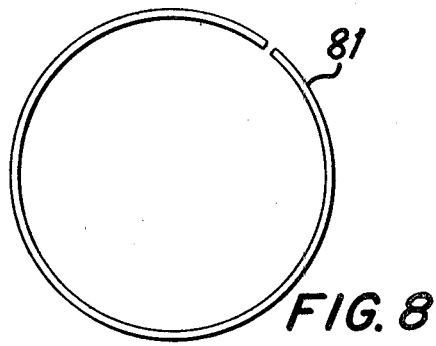

FIG. 7 illustrates an annular trifurcated element 71 of closed type in accordance with the invention, while FIG. 8 illustrates an annular trifurcated element 81 of the open (split) type.

The advance obtained as a result of the present invention is substantial. Thus, composite bead rings in accordance with the present invention have been tested in comparison with the known composite bead rings, in tires of size 11-22.5. The unitary bead rings used were identical, of the standed type, of steel wire, with an assembly formula as follows:

A core of 2.1 mm. in diameter, a first layer of 8 wires of a 1.3 mm. diameter, a second layer of 12 wires of 1.5 mm. diameter. The tires in accordance with the invention showed incipient cracking of the rubber at the height of the beads after a mileage equal to 1.7 times the mileage at the end of which the tires having the known composite bead rings showed the same damage. With respect to the breaking of wires by fatigue, no break could be noted after a mileage 1.7 times greater than that by the end of which wire breaks were noted in the known composite bead rings.

What is claimed is:

1. A pneumatic tire having (a) a bead reinforcement which comprises at least one composite bead ring formed of three unitary bead rings at least two of which are of the stranded type and are formed of a plurality of steel wires, the radial cross sections of the three unitary bead rings being arranged along the three apices of a triangle which is fixed with respect to the rotational axis of the tire, and (b) a sidewall reinforcement folded around the composite bead ring, characterized by the fact that an annular trifurcated element is arranged between the unitary bead rings so that each of the three branches of the annular trifurcated element is tangent to the radial cross sections of two and of only two of the unitary bead rings, the ends of said branches being located on the inside of the apparent surface defined by the outer contour of the composite bead ring; the annular trifurcated element having the terminal portion of at least one of its branches shaped so as to form a groove which partially surrounds a unitary bead ring.

2. The pneumatic tire according to claim 1, characterized by the fact that the annular trifurcated element is an elastic closed ring.

3. The pneumatic tire according to claim 1, characterized by the fact that the annular trifurcated element is an open (split) ring consisting of a relatively rigid material.

4. The pneumatic tire according to claim 1, characterized by the fact that the annular trifurcated element is a hollow profiled element.

5. The pneumatic tire according to claim 1 or 3, characterized by the fact that at least the two radially innermost unitary bead rings are of the stranded type, of steel wires, and have equal radii with respect to the axis of rotation of the tire.

6. The pneumatic tire according to claim 1 or 3, characterized by the fact that at least the two radially innermost unitary bead rings are of the stranded type, of steel wires, and have unequal radii with respect to the axis of rotation of the tire.

7. The pneumatic tire according to claim 5, characterized by the fact that the annular trifurcated element has a straight radially inwardly oriented branch, the two other branches being longer than said straight branch and bent in opposite directions toward the axis of rotation of the tire.

8. The pneumatic tire according to claim 6, characterized by the fact that the annular trifurcated element has a straight radially inwardly oriented branch, the two other branches being longer than said straight branch and bent in opposite directions toward the axis of rotation of the tire.